United States Patent
Ahn et al.

(10) Patent No.: US 10,764,834 B2
(45) Date of Patent: *Sep. 1, 2020

(54) UPLINK TRANSMISSION POWER CONTROL METHOD AND APPARATUS

(71) Applicant: LG Electronics Inc., Seoul (KR)

(72) Inventors: Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,623

(22) Filed: Oct. 7, 2019

(65) Prior Publication Data
US 2020/0045640 A1 Feb. 6, 2020

Related U.S. Application Data

(63) Continuation of application No. 16/376,372, filed on Apr. 5, 2019, now Pat. No. 10,440,658, which is a
(Continued)

(51) Int. Cl.
*H04W 52/14* (2009.01)
*H04W 52/58* (2009.01)
(Continued)

(52) U.S. Cl.
CPC ......... *H04W 52/146* (2013.01); *H04W 52/54* (2013.01); *H04W 52/58* (2013.01);
(Continued)

(58) Field of Classification Search
CPC ... H04W 52/14; H04W 52/146; H04W 52/54; H04W 72/0413; H04W 72/1289
See application file for complete search history.

(56) References Cited

U.S. PATENT DOCUMENTS 9,907,032 B2 * 2/2018 Wang ............... H04W 52/281
1,014,924 A1 12/2018 Ahn et al.
(Continued)

FOREIGN PATENT DOCUMENTS

JP 2013516871 5/2013
KR 1020100114852 10/2010
(Continued)

OTHER PUBLICATIONS

3GPP TS 36.213 V10.12.0 (Mar. 2014): 3rd Generation Partnership Project: Technical Specification Group Radio Access Network; Evolved Universal Terrestrial Radio Access (E-UTRA): Physical layer procedures (Release 10): 14 Pages.
(Continued)

*Primary Examiner* — Lewis G West
(74) *Attorney, Agent, or Firm* — Fish & Richardson P.C.

(57) ABSTRACT

A method and an apparatus for controlling uplink transmission power in a wireless communication system are provided. The apparatus receives transmit power command (TPC) monitoring information for receiving a plurality of TPCs for adjusting uplink transmission power for a plurality of serving cells. The apparatus obtains the plurality of TPCs by monitoring a downlink control channel on the basis of the TPC monitoring information.

8 Claims, 6 Drawing Sheets

Related U.S. Application Data continuation of application No. 16/196,449, filed on Nov. 20, 2018, now Pat. No. 10,292,110, which is a continuation of application No. 15/535,207, filed as application No. PCT/KR2015/013685 on Dec. 14, 2015, now Pat. No. 10,149,249.

(60) Provisional application No. 62/091,631, filed on Dec. 15, 2014.

(51) Int. Cl.
*H04W 52/54* (2009.01)
*H04W 52/34* (2009.01)
*H04W 72/04* (2009.01)
*H04W 72/12* (2009.01)

(52) U.S. Cl.
CPC ........ *H04W 52/34* (2013.01); *H04W 72/0413* (2013.01); *H04W 72/1289* (2013.01)

(56) References Cited

U.S. PATENT DOCUMENTS

| | | | | |
|---|---|---|---|---|
| 10,149,249 | B2* | 12/2018 | Ahn | H04W 52/54 |
| 10,292,110 | B2* | 5/2019 | Ahn | H04W 52/146 |
| 10,440,658 | B2* | 10/2019 | Ahn | H04W 52/58 |
| 2011/0081939 | A1* | 4/2011 | Damnjanovic | H04W 52/08 |
| | | | | 455/522 |
| 2012/0039180 | A1* | 2/2012 | Kim | H04L 5/0053 |
| | | | | 370/241 |
| 2012/0208583 | A1 | 8/2012 | Chung et al. | |
| 2013/0215875 | A1* | 8/2013 | Yang | H04W 72/0446 |
| | | | | 370/336 |
| 2014/0050205 | A1 | 2/2014 | Ahn et al. | |
| 2015/0223234 | A1* | 8/2015 | Seo | H04W 52/242 |
| | | | | 370/329 |
| 2016/0286495 | A1* | 9/2016 | Dinan | H04W 28/0221 |
| 2017/0013611 | A1* | 1/2017 | Dinan | H04W 52/146 |

FOREIGN PATENT DOCUMENTS

| | | |
|---|---|---|
| KR | 1020140091775 | 7/2014 |
| WO | WO2011082744 | 7/2011 |
| WO | WO2012108688 | 8/2012 |
| WO | WO2014038908 | 3/2014 |
| WO | WO2014108094 | 7/2014 |

OTHER PUBLICATIONS

3GPP TS 36.213 V8.8.0; Sep. 29, 2009; $3^{rd}$ Generation Partnership Project: Technical Specification Group Radio Access Network: Evolved Universal Terrestrial Radio Access (E-UTRA): Physical layer procedures (Release 8): 79 Pages. See section 5. http://www.3gpp.org/dynareport/36213.htm.

LG Electronics, "Cross carrier PC with DCI format 3/3A," 3GPP TSG RAN WG1 #64, R1-110882, Taipei, Taiwan, Feb. 21-25, 2011, 2 pages.

* cited by examiner

UPLINK TRANSMISSION POWER CONTROL METHOD AND APPARATUS

CROSS-REFERENCE TO RELATED APPLICATIONS

This application is a continuation of U.S. application Ser. No. 16/376,372, filed on Apr. 5, 2019, now allowed, which is a continuation of U.S. application Ser. No. 16/196,449, filed on Nov. 20, 2018, now U.S. Pat. No. 10,292,110, which is a continuation of U.S. application Ser. No. 15/535,207, filed on Jun. 12, 2017, now U.S. Pat. No. 10,149,249, which is a National Stage application under 35 U.S.C. § 371 of International Application No. PCT/KR2015/013685, filed on Dec. 14, 2015, which claims the benefit of U.S. Provisional Application No. 62/091,631, filed on Dec. 15, 2014. The disclosures of the prior applications are incorporated by reference in their entirety.

BACKGROUND OF THE INVENTION

Field of the Invention

The present invention relates to wireless communication, and more particularly, to a method for controlling uplink transmission power in a wireless communication system and an apparatus using the same.

Related Art

With the development of mobile technology, data traffic usage is rapidly increasing. Standardization and technical development in various fields are underway to quickly process a great amount of data traffic using limited radio resources. Representative technologies are 3D beamforming, massive multiple-input multiple-output (MIMO), a heterogeneous network, and a small cell.

A small cell is a technology for increasing traffic capacity and data rate. Generally, a small cell is deployed as a hotspot in macrocell coverage. A backhaul between a small cell and a macrocell may be ideal or non-ideal. An ideal backhaul is assumed in intra-site carrier aggregation (CA) or coordinated multi-point (CoMP) technology. Dual connectivity is referred to as inter-site CA, in which a non-ideal backhaul is assumed.

A method for controlling uplink transmission power with a plurality of cells set is proposed.

SUMMARY OF THE INVENTION

The present invention provides a method for controlling uplink transmission power in a wireless communication system and an apparatus using the same.

In an aspect, a method for controlling uplink transmission power in a wireless communication system is provided. The method includes receiving, by a wireless device, transmit power command (TPC) monitoring information for receiving a plurality of TPCs to adjust an uplink transmission power for a plurality of serving cell, receiving, by the wireless device, a TPC payload by monitoring a downlink control channel based on the TPC monitoring information, acquiring a plurality of TPCs within the TPC payload, and applying the plurality of TPCs to the uplink transmission power for each of the plurality of serving cells.

The TPC monitoring information may comprise a TPC identifier masked with a cyclic redundancy check (CRC) of the downlink control channel and information on a plurality of TPC indexes indicating the plurality of TPCs within the TPC payload.

The TPC monitoring information may comprise information on a size of the TPC payload.

In another aspect, an apparatus for controlling uplink transmission power in a wireless communication system includes a transceiver configured to transmit and receive a radio signal, and a processor connected to the transceiver. The processor is configured to instruct the transceiver to receive transmit power command (TPC) monitoring information for receiving a plurality of TPCs to adjust an uplink transmission power for a plurality of serving cell, instruct the transceiver to receive a TPC payload by monitoring a downlink control channel based on the TPC monitoring information, instruct the transceiver to acquire a plurality of TPCs within the TPC payload, and instruct the transceiver to apply the plurality of TPCs to the uplink transmission power for each of the plurality of serving cells.

When a plurality of uplink channels is transmitted from a plurality of serving cells, it is possible to adjust uplink transmission power for each uplink channel.

DESCRIPTION OF EXEMPLARY EMBODIMENTS

Figure 1:
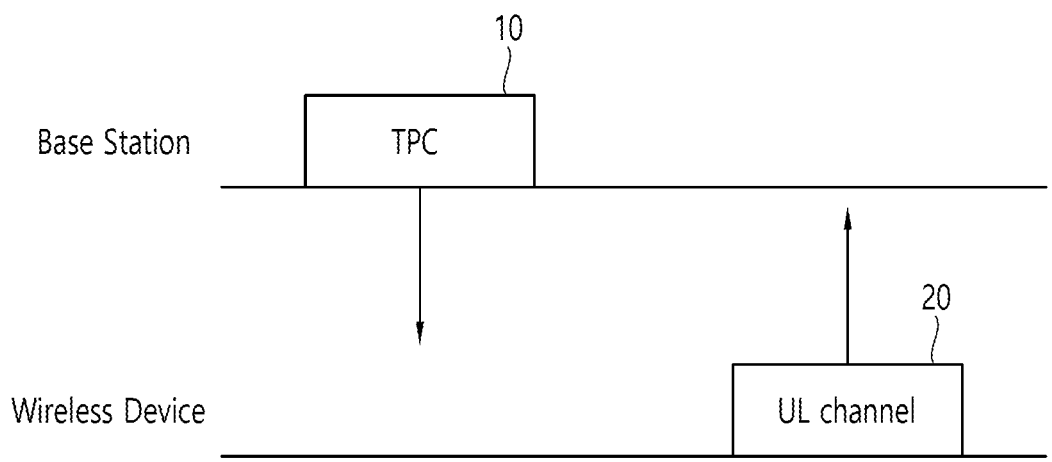
FIG. 1 shows uplink (UL) power control in existing 3GPP LTE.

A wireless device may be fixed or mobile, and a user equipment (UE) may be referred to as another term, such as a mobile station (MS), a mobile terminal (MT), a user terminal (UT), a subscriber station (SS), a personal digital assistant (PDA), a wireless modem, a handheld device, and the like. Alternatively, the wireless device may be a device supporting only data communication, such as a machine-type communication (MTC) device.

A base station (BS) generally refers to a fixed station that communicates with a wireless device and may be referred to as another term, such as an evolved NodeB (eNB), a base transceiver system (BTS), an access point (AP), and the like.

In the following description, the present invention is applied on the basis of 3rd Generation Partnership Project (3GPP) Long Term Evolution (LTE) based on the 3GPP Technical Specifications (TSs). However, this is merely an example, and the present invention may be applied to various wireless communication networks.

In 3GPP LTE, scheduling is performed per subframe. For example, one subframe has a length of 1 ms, which is defined as a transmission time interval (TTI). A radio frame includes 10 subframes, and one subframe may include two consecutive slots. A subframe may include a plurality of orthogonal frequency division multiplexing (OFDM) symbols. As 3GPP LTE uses orthogonal frequency division multiple access (OFDMA) in a downlink (DL), an OFDM symbol is provided merely to express one symbol period in a time domain, and the present invention is not limited by a multiple access mode or term. For example, an OFDM symbol may be referred to as another term, such as a single carrier-frequency division multiple access (SC-FDMA) symbol, a symbol interval, and the like. According to 3GPP LTE, one subframe includes 14 OFDM symbols in a normal cyclic prefix (CP), and one subframe includes 12 OFDM symbols in an extended CP.

Physical channels in 3GPP LTE may be divided into downlink (DL) physical channels and uplink (UL) physical channels. The DL physical channels include a physical downlink control channel (PDCCH), a physical control format indicator channel (PCFICH), a physical hybrid-ARQ indicator channel (PHICH), and a physical downlink shared channel (PDSCH). The UL physical channels include a physical uplink control channel (PUCCH) and a physical uplink shared channel (PUSCH).

A PCFICH transmitted in the first OFDM symbol of a subframe carries a control format indicator (CIF) on the number of OFDM symbols used for transmission of control channels in the subframe (i.e., the size of a control region). A wireless device first receives the CIF on the PCFICH and then monitors a PDCCH.

A PHICH carries a positive-acknowledgement (ACK)/negative-acknowledgement (NACK) signal for an uplink hybrid automatic repeat request (HARD). The ACK/NACK signal for uplink (UL) data on a PUSCH transmitted by the wireless device is sent on the PHICH.

Control information transmitted through a PDCCH is referred to as downlink control information (DCI). The DCI may include PDSCH resource allocation (which is also referred to as a downlink (DL) grant), PUSCH resource allocation (which is also referred to as an uplink (UL) grant), a set of transmission power control commands for individual UEs in a UE group, and/or activation of Voice over Internet Protocol (VoIP).

Blind decoding is used for detecting a PDCCH. Blind decoding is a scheme in which a wireless device demasks a cyclic redundancy check (CRC) of a received PDCCH (which is referred to as a candidate PDCCH) with a desired identifier and checks a CRC error to identify whether the PDCCH is a control channel for the wireless device. A BS determines a PDCCH format according to DCI to be sent to a wireless device and adds a CRC to the DCI. Then, the BS masks the CRC with a unique identifier (which is referred to as a radio network temporary identifier (RNTI)) depending on the owner or purpose of the PDCCH.

A PUCCH carries uplink control information (UCI) and supports multiple formats. A PUCCH having a different number of bits per subframe may be used depending on a modulation scheme subordinate to a PUCCH format. PUCCH format 1 is used for transmission of a scheduling request (SR); PUCCH format 1a/1b is used for transmission of a CQI; and PUCCH format 2a/2b is used for simultaneous transmission of CQI and an ACK/NACK signal.

FIG. 1 shows UL power control in existing 3GPP LTE.

A BS transmits information on a transmit power command (TPC) 10 to a wireless device. The TPC 10 is information sent by the BS to adjust UL transmission power and is received on a PDCCH. First, the TPC 10 may be transmitted via DCI along with scheduling information for DL transmission or UL transmission. Second, the TPC 10 may be transmitted via DCI sending UL transmission power (which is referred to as DCI format 3/3A). A 1-bit TPC indicates DCI format 3A, while a 2-bit TPC indicates DCI format 3.

The wireless device determines UL transmission power based on the TPC 10 and transmits a UL channel 20 based on the UL transmission power.

Referring to Section 5 in 3GPP TS 36.213 V10.12.0 (2014-03), transmission power PPUSCH(i) for PUSCH transmission in subframe i is defined as below:

$$P_{PUSCH}(i) = \min \begin{Bmatrix} P_{CMAX}(i), \\ 10\log_{10}(M_{PUSCH}(i)) + P_{O\_PUSCH}(j) + \\ \alpha(j)PL_c + \Delta_{TF}(i) + f(i) \end{Bmatrix}$$ [Equation 1]

where $P_{CMAX}$ is a maximum transmission power configured for subframe i, $M_{PUSCH}(i)$ is a PUSCH resource allocation bandwidth for subframe i, $P_{O\_PUSCH}(j)$ is a parameter given from an upper layer, $\alpha(j)$ is a parameter given to an upper layer, PLc is a DL path loss estimate calculated by a wireless device, $\Delta_{TF}(i)$ is a wireless device-specific parameter, and f(i) is a specified value acquired from a TPC.

A transmission power $P_{PUCCH}(i)$ for PUCCH transmission in subframe i is defined as below:

$$P_{PUCCH}(i) = \min \begin{Bmatrix} P_{CMAX}(i), \\ P_{O\_PUCCH} + PL_c + h(n_{CQI}, n_{HARQ}, n_{SR}) + \\ \Delta_{F\_PUCCH}(F) + \Delta_{TxD}(F) + g(i) \end{Bmatrix}$$ [Equation 2]

where $P_{CMAX}$ is a maximum transmission power configured for subframe i,

PLc is a DL path loss estimate calculated by a wireless device, $P_{O\_PUCCH}$ is a parameter given by a BS, $h(n_{CQI}, n_{HARQ}, n_{SR})$ is a value dependent to a PUCCH format, $\Delta_{F\_PUCCH}(F)$ is a parameter given by an upper layer, $\Delta_{TxD}(F)$ is a value set when a PUCCH is transmitted through multiple antennas, and g(i) is a specified value acquired from a TPC.

Figure 2:
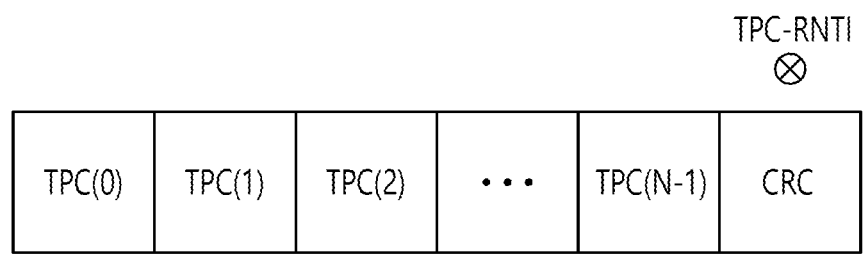
FIG. 2 shows an example of DCI format 3/3A in 3GPP LTE.

FIG. 2 shows an example of DCI format 3/3A in 3GPP LTE.

TPC(n) is an nth TPC value, and n is a TPC index. N TPC values form a payload, and a CRC is added thereto. The CRC is masked with a TPC-RNTI to identify DCI format 3/3A having a TPC.

A wireless device demasks the TCP-RNTI to monitor a PDCCH per subframe. When DCI is received a PDCCH without a CRC error, the wireless device applies a TPC corresponding to a pre-assigned TPC index to UL transmission power.

Hereinafter, a multi-cell environment is described.

In a carrier aggregation (CA) environment or dual connectivity environment, a wireless device may be served by a plurality of serving cells. Each serving cell may be defined by a downlink (DL) component carrier (CC) or a pair of a DL CC and a UL CC.

The serving cells may be divided into a primary cell and a second army cell. A primary cell is a cell that operates at a primary frequency, performs an initial connection establishment process, starts a connection reestablishment process, or is designated as a primary cell in a handover process. A secondary cell operates at a secondary frequency, may be configured after a radio resource control (RRC) connection is established, and may be used to provide an additional radio resource. At least one primary cell is always configured, and a secondary cell may be added/modified/released by an upper-layer signaling (for example, an RRC message). The primary cell may have a fixed cell index (CI). For example, the lowest CI may be assigned to the primary cell. Hereinafter, the primary cell has a CI of 0, and secondary cells are sequentially assigned CIs from 1.

Figure 3:
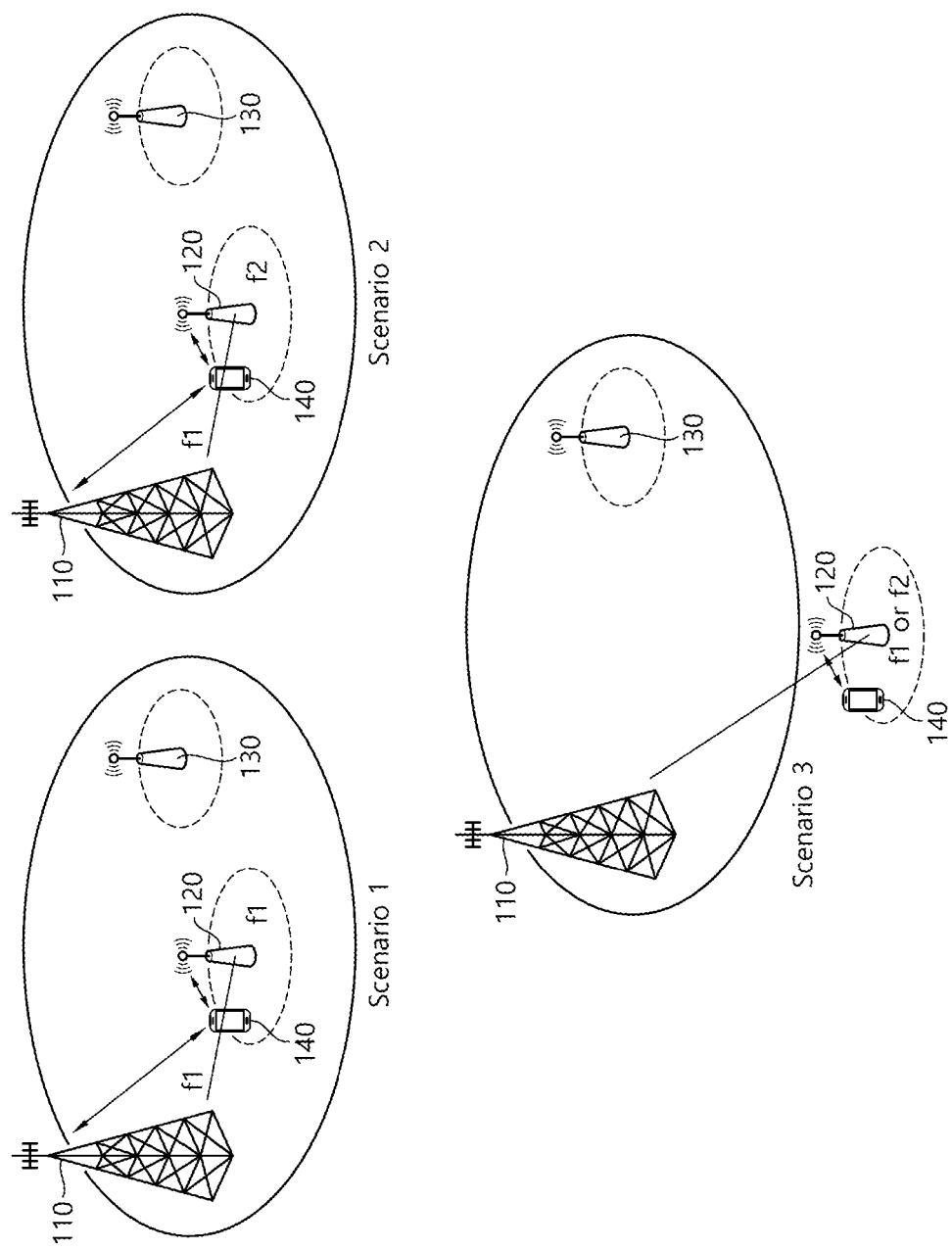
FIG. 3 shows various examples of scenarios of configuring a plurality of cells.

FIG. 3 shows various examples of scenarios of configuring a plurality of cells.

A first BS 110 is a macro BS having large coverage, and second and third BSs 120 and 130 are small BSs having relatively small coverage. A cell managed by the macro BS 110 is a macro cell, and cells managed by the small cells 120 and 130 are small cells. Each of the BSs 110, 120, and 130 may manage one or more cells.

In scenario 1, the macro BS 110 and the small BSs 120 and 130 communicate with a wireless device 140 using the frequency band. In scenario 2, the macro BS 110 and the small BSs 120 and 130 communicate with the wireless device 140 using different frequency band. In scenario 2, the small BS 120 is located out of the coverage of the macro BS 110 and communicates with the wireless device 140 using a frequency band the same as or different from that for the macro BS 110.

In a dual connectivity situation, a master cell group (MCG) and a secondary cell group (SCG) may be configured for a wireless device for which a plurality of cells is configured. The MCG is a serving cell group having a primary cell (PCell) and zero or more secondary cells (SCells). The MCG may be served by the macro BS 110, and the SCG may be served by one or more small BSs 120 and 130. The SCG is a secondary cell group having a primary secondary cell (PSCell) and zero or more secondary cells. An MCG cell is a cell belonging to the MCG, and an SCG cell is a cell belonging to the SCG. The PSCell is a secondary cell to which the wireless device performs random access and to which an uplink control channel (for example, a PUCCH) is transmitted.

To prevent a concentration of PUCCH traffic in a specific cell, a network may support PUCCH offloading in a CA situation although not supporting dual connectivity. The network may divide a plurality of serving cells configured for a wireless device into a plurality of cell groups and may configure at least one cell in each cell group to transmit a PUCCH.

Hereinafter, a cell group including a PCell is defined as a first cell group, and a cell group including at least one secondary cell is defined as a second cell group. A cell capable of PUCCH transmission in the first cell group is defined as a first PUCCH cell, and a cell capable of PUCCH transmission in the second cell group is defined as a second PUCCH cell. The first PUCCH cell and the second PUCCH cell may independently transmit a UL channel. The first PUCCH cell may be the PCell. The second PUCCH cell may be a PSCell or SCell. Hereinafter, the first PUCCH cell may be designated by a PCell, and the second PUCCH cell may be designated by a PPCell. The PCell may send a message to designate a PPCell among cells in the second cell group.

As described above, PUCCH transmission in only one cell is considered for existing UL transmission power. Thus, it is proposed how to control UL transmission power for two PUCCHs when the two PUCCHs are transmitted in the PCell and the PPCell.

Although the following description is made on controlling UL transmission power for two PUCCHs transmitted in two cells, a person skilled in the art may readily apply this description to controlling UL transmission power for a plurality of PUCCHs transmitted in a plurality of cells.

First, the PCell and the PPCell are given DCI format 3/3A illustrated in FIG. 2, which may be used for control of PUCCH transmission power for the cells. For example, suppose that the PCell receives first DCI format 3 and the PPCell receives second DCI format 3. First DCI format 3 may be monitored based on a first TPC-RNTI, and second DCI format 3 may be monitored based on a second TPC-RNTI. The wireless device may apply a TPC of first DCI format 3 to transmission power for a first PUCCH transmitted in the PCell and may apply a TPC of second DCI format 3 to transmission power for a second PUCCH transmitted in the PPCell. In this manner, the wireless device has an advantageous of utilizing the existing DCI format 3/3A structure. However, the wireless device performs separate blind decoding on the two DCI formats, thus increasing additional monitoring loads.

Figure 4:
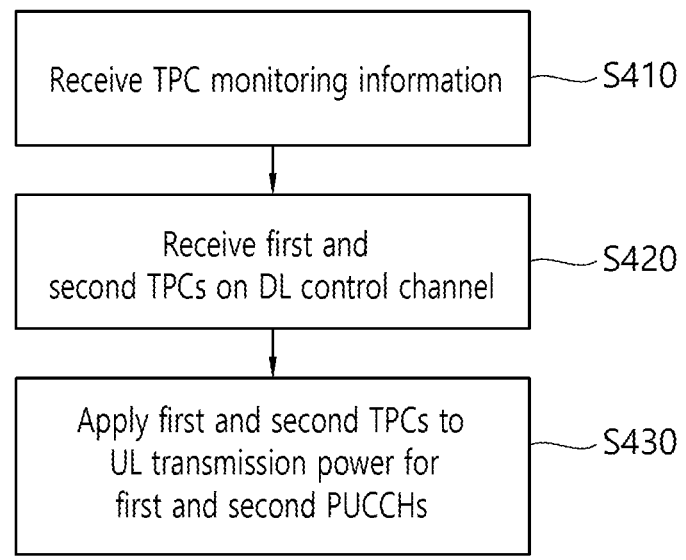
FIG. 4 is a flowchart illustrating UL transmission power control according to one embodiment of the present invention.

FIG. 4 is a flowchart illustrating UL transmission power control according to one embodiment of the present invention.

A wireless device receives TPC monitoring information (S410). The TPC monitoring information is information used for the wireless device to monitor a DL control channel having a TPC over a plurality of cells. The TPC monitoring information may be received through an RRC message, a medium access control (MAC) message, or DCI.

The following table illustrates examples of elements included in the TPC monitoring information. Illustrated terms are provided only for illustrative purposes, and not all elements are essential.

TABLE 1

| Term | Description |
| --- | --- |
| MTPC-RNTI | Identifier masked with CRC of DCI including TPC over a plurality of cells |
| First TPC-index | Index of TPC applied to PUCCH transmission in first PUCCH cell |
| Second TPC-index | Index of TPC applied to PUCCH transmission in second PUCCH cell |
| TPC payload size | Payload size of DCI and/or information on total number of TPCs in DCI |

The wireless device monitors a PDCCH based on the TPC monitoring information to receive a TPC (S420). The PDCCH may be monitored in a common search space of a corresponding subframe in a PCell.

The TPC monitoring information may include information on the type or location of a search space in which the PDCCH is to be monitored. The TPC monitoring information may include information on a cell in which the PDCCH is to be monitored.

The wireless device identifies a CRC of the PDCCH using an MTPC-RNTI in the common search space. When no CRC error is detected, the wireless device acquires a TPC payload from the PDCCH. The wireless device may acquire a first TPC corresponding to a first TPC-index and a second TPC corresponding to a second TPC-index from the TPC payload.

The first TPC and the second TPC may have the same number of bits (1 bit or 2 bit). Alternatively, the first TPC and the second TPC may have different numbers of bits.

The wireless device applies the first TPC to transmission power for a first PUCCH and applies the second TPC to transmission power for a second PUCCH (S430). The transmission powers for the respective PUCCHs may be calculated by Equation 2. The first PUCCH may be transmitted in the PCell, and the second PUCCH may be transmitted in a PPCell. The first PUCCH and the second PUCCH may be transmitted in the same subframe or in different subframes.

A BS transmits TCP information to be applied to a PUCCH transmitted in a plurality of PUCCH cells to each wireless device on a PDCCH. The payload size of the TPC information may be defined according to the payload size of existing DCI format 3/3A in order to reduce the number of PDCCH blind detection times.

Meanwhile, a TPC-RNTI may be assigned per PUCCH cell. The BS may set a separate TPC-RNTI and a separate TPC-index for each PUCCH cell. The wireless device may receive a TPC over each different cell on each different PDCCH.

Alternatively, a common TPC-index may be applied to two or more PUCCH cells, and a separate TPC RNTI may be assigned per PUCCH cell.

The same TPC-RNTI and the same TPC-index may be applied to all PUCCH cells.

Figure 5:
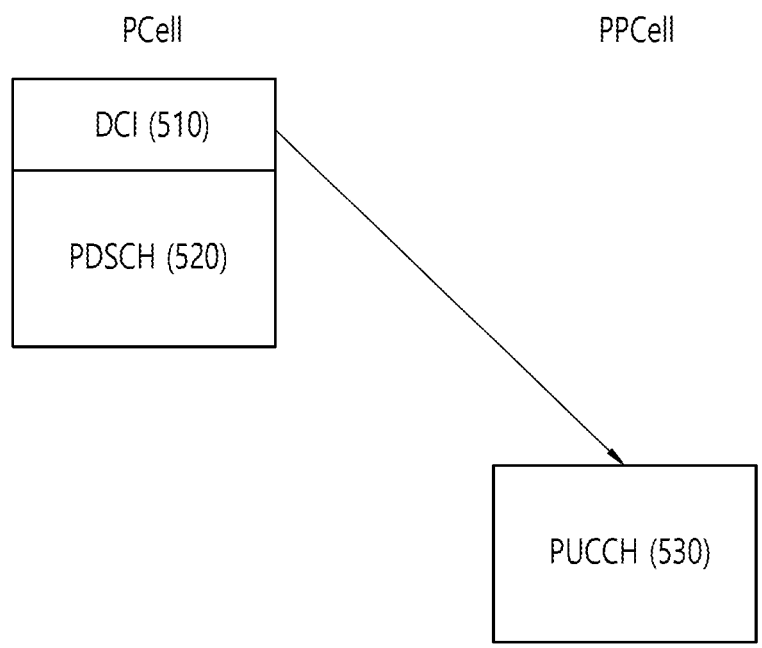
FIG. 5 shows UL transmission power control according to another embodiment of the present invention.

FIG. 5 shows UL transmission power control according to another embodiment of the present invention, which is UL power control using DL scheduling DCI.

DCI 510 received in a PCell includes information on DL scheduling for a PDSCH 520 and a TPC. A wireless transmits an HARQ ACK/NACK for the PDSCH 520 on a PUCCH 530 in a PPCell.

The DCI 510 may include a TPC over the PUCCH 530. When the ACK/NACK feedback on the PDSCH 520 of the PCell is transmitted in the PPCell, the TPC in the DCI 510 scheduling the PDSCH 520 is applied to the PUCCH 530 for the ACK/NACK feedback.

The DIC 510 is transmitted not only in the PCell but may be transmitted in an SCell in which a PDSCH or PDCCH is transmitted.

Hereinafter, an initial power setting for setting up PUCCH transmission power is described with reference to Equation 2.

In Equation 2, PO_PUCCH is an offset value given by a BS, and g(i) is a value constantly adjusted by a TPC. In detail, $P_{O\_PUCCH}$ includes $P_{O\_NOMINAL\_PUCCH}$ as a value reflecting a cell-common environment and $P_{O\_UE\_PUCCH}$ as a value reflecting an environment of each wireless device. g(i) is initialized to g(0)=0 when $P_{0\_PUCCH}$ is initially set or reset. When a random access process is performed, the sum of $\Delta P_{rampup}$ as a cumulative value adjusted in the random access process and $\delta_{msg2}$ given in a random access response is initialized to $g(0)=\Delta P_{rampup}+\delta_{msg2}$.

$P_{0\_PUCCH}$ to be applied to PUCCH transmission power for each PUCCH cell may be configured as follows.

(1) Set $P_{0\_PUCCH}$ for each PUCCH cell through RRC signaling (2) Use the same $P_{0\_PUCCH}$ configured for the PCell to another PUCCH cell (3) Set an offset value per PUCCH cell for $P_{0\_PUCCH}$ configured for the PCell through RRC signaling (4) Use the same $P_{0\_NOMINAL}$ PUCCH configured for the PCell to another PUCCH cell and set $P_{O\_UE\_PUCCH}$ per PUCCH cell through RRC signaling, which is useful when there is similarity in coverage, frequency, and positional environment between the PPCell and the PCell but it is intended to differentiate the PUCCH transmission performance of the wireless device between the PCell and the PPCell.

(5) Use the same $P_{O\_UE\_PUCCH}$ configured for the PCell to another PUCCH cell and set $P_{0\_NOMINAL\_PUCCH}$ per PUCCH cell through RRC signaling, which is useful when there is difference in coverage, frequency, and positional environment between the PPCell and the PCell but it is intended to manage the PUCCH transmission performance of the wireless device at a similar level between the PCell and the PPCell.

g(t) to be applied to PUCCH transmission power for each PUCCH cell may be initialized as follows. When no random access process is performed in a corresponding PUCCH cell, g(0) may be set as follows.

(1) When new P0_PUCCH is set for the PUCCH cell or new $P_{0\_PUCCH}$ is set for the PCell, set g(0)=0.

(2) Set g(0) to the sum of $\Delta P_{rampup}$ and $\delta_{msg2}$ adjusted in the last random access process performed in the PCell. This may be applied when new $P_{0\_PUCCH}$ is not set for the PUCCH cell or new $P_{0\_PUCCH}$ is not set for the PCell.

(3) Set whether to apply (1) or (2) through RRC signaling.

Figure 6:
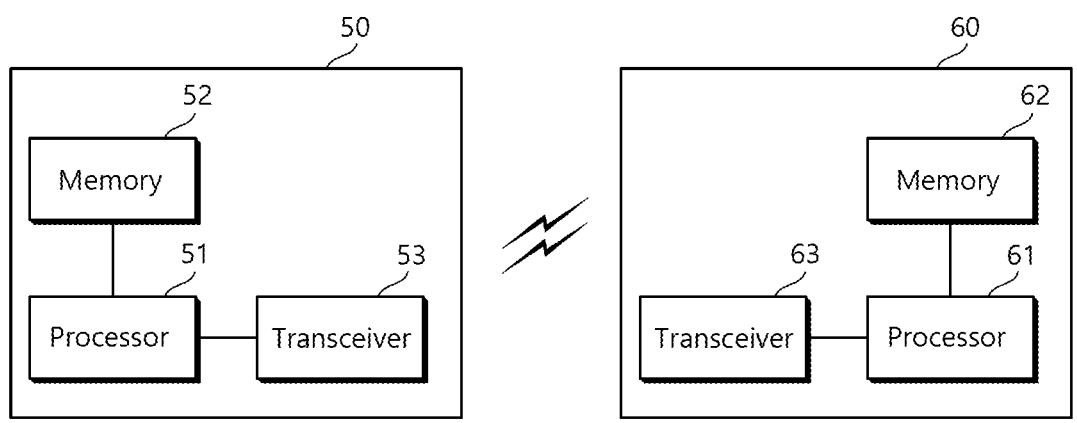
FIG. 6 is a block diagram illustrating a wireless communication system according to one embodiment of the present invention.

FIG. 6 is a block diagram illustrating a wireless communication system according to one embodiment of the present invention.

A wireless device 50 includes a processor 51, a memory 52 and a transceiver 53. The memory 52 is connected to the processor 51, and stores various instructions implemented by the processor 51. The transceiver 53 is connected to the processor 51, and transmits and/or receives radio signals. The processor 51 implements proposed functions, processes and/or methods. In the above embodiments, a UL control operation of the wireless device may be implemented by the processor 51. When the above embodiments are implemented by a software instruction, the instruction may be stored in the memory 52 and may be executed by the processor 51 to perform the above operation.

A BS 60 includes a processor 61, a memory 62 and a transceiver 63. The BS 60 may operate in an unlicensed band. The memory 62 is connected to the processor 61, and stores various instructions implemented by the processor 61. The transceiver 63 is connected to the processor 61, and transmits and/or receives radio signals. The processor 61 implements proposed functions, processes and/or methods. In the above embodiments, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method performed by a base station operating in a wireless communication system, the method comprising:
   transmitting transmit power command (TPC) monitoring information to adjust an uplink transmission power for a first physical uplink control channel (PUCCH) cell and a second PUCCH cell, the TPC monitoring information including a first TPC index assigned to the first PUCCH cell and a second TPC index assigned to the second PUCCH cell,
      wherein the base station is configured to manage a first set of serving cells and a second set of serving cells,
      wherein the first PUCCH cell is a cell which is capable of transmitting a first PUCCH in the first set of serving cells, and
      wherein the second PUCCH cell is a cell which is capable of transmitting a second PUCCH in the second set of serving cells; and
   transmitting a TPC payload on a downlink control channel, the TPC payload including a plurality of TPCs,
   wherein the first TPC index represents a first TPC for the first PUCCH cell from the plurality of TPCs and a second TPC index represents a second TPC for the second PUCCH cell from the plurality of TPCs.

2. The method of claim 1, wherein the TPC monitoring information comprises a TPC identifier masked with a cyclic redundancy check (CRC) of the downlink control channel.

3. The method of claim 1, wherein the first PUCCH cell is a primary cell and the second PUCCH cell is a primary secondary cell.

4. The method of claim 1, wherein the TPC monitoring information is received via a radio resource control (RRC) message.

5. A device configured to operate in a wireless communication system, the device comprising:
   a transceiver configured to transmit and receive a radio signal; and
   a processor connected to the transceiver and configured to:
   instruct the transceiver to transmit power command (TPC) monitoring information to adjust an uplink transmission power for a first physical uplink control channel (PUCCH) cell and a second PUCCH cell, the TPC monitoring information including a first TPC index assigned to the first PUCCH cell and a second TPC index assigned to the second PUCCH cell,
      wherein the device is configured to manage a first set of serving cells and a second set of serving cells,
      wherein the first PUCCH cell is a cell which is capable of transmitting a first PUCCH in the first set of serving cells, and
      wherein the second PUCCH cell is a cell which is capable of transmitting a second PUCCH in the second set of serving cells; and
   instruct the transceiver to transmit a TPC payload on a downlink control channel, the TPC payload including a plurality of TPCs,
   wherein the first TPC index represents a first TPC for the first PUCCH cell from the plurality of TPCs and a second TPC index represents a second TPC for the second PUCCH cell from the plurality of TPCs.

6. The device of claim 5, wherein the TPC monitoring information comprises a TPC identifier masked with a cyclic redundancy check (CRC) of the downlink control channel.

7. The device of claim 5, wherein the first PUCCH cell is a primary cell and the second PUCCH cell is a primary secondary cell.

8. The device of claim 5, wherein the TPC monitoring information is received via a radio resource control (RRC) message.

* * * * *